United States Patent [19]

Beasley

[11] 4,024,383

[45] May 17, 1977

[54] METHOD AND SYSTEM FOR NAVIGATION EMPLOYING INCREMENTAL RANGE DIFFERENCE

[75] Inventor: T. James Beasley, Reseda, Calif.

[73] Assignee: Lockheed Aircraft Corporation, Burbank, Calif.

[22] Filed: Sept. 2, 1975

[21] Appl. No.: 609,215

[52] U.S. Cl. .................. 235/150.27; 343/112 R
[51] Int. Cl.² .............................................. G01S 5/02
[58] Field of Search ............... 235/150.26, 150.27, 235/150.2; 343/10, 12 R, 15, 16 R, 112 R, 112 C, 112 D, 112 PT, 114; 340/27 NA

[56] References Cited

UNITED STATES PATENTS

| | | | |
|---|---|---|---|
| 2,855,595 | 10/1958 | Koeppel | 235/150.27 |
| 3,710,331 | 1/1973 | Kiisk | 235/150.27 |
| 3,863,256 | 1/1975 | Smith | 235/150.27 |
| 3,881,096 | 4/1975 | Schmidt | 235/150.27 |

Primary Examiner—Malcolm A. Morrison
Assistant Examiner—Errol A. Krass
Attorney, Agent, or Firm—Billy G. Corber; Ralph M. Flygare

[57] ABSTRACT

A navigation method and system suitable for highly accurate all-weather navigation of vehicles such as ships and aircraft. An initial position of the vehicle relative to a plurality of known points each located at predetermined geographic positions is first determined. The distance or range of the initial position from each of the plurality of known points is determined and when the vehicle moves to a second and unknown position, the difference between the propagation time of electromagnetic wave energy transmitted from each of the plurality of known points at the initial and second positions is determined to thereby determine an incremental change in the distance to the second position from each of the plurality of known points. The distance of the initial position and the incremental change in distance from each of the plurality of points are algebraically summed to thereby determine the distance of the second position from each of the plurality of known points, and the second position is determined from the determined distances of the second position from each of the plurality of known points. The invention is compatible with existing navigation systems such as LORAN or other systems which periodically transmit wave energy at regular intervals.

9 Claims, 9 Drawing Figures

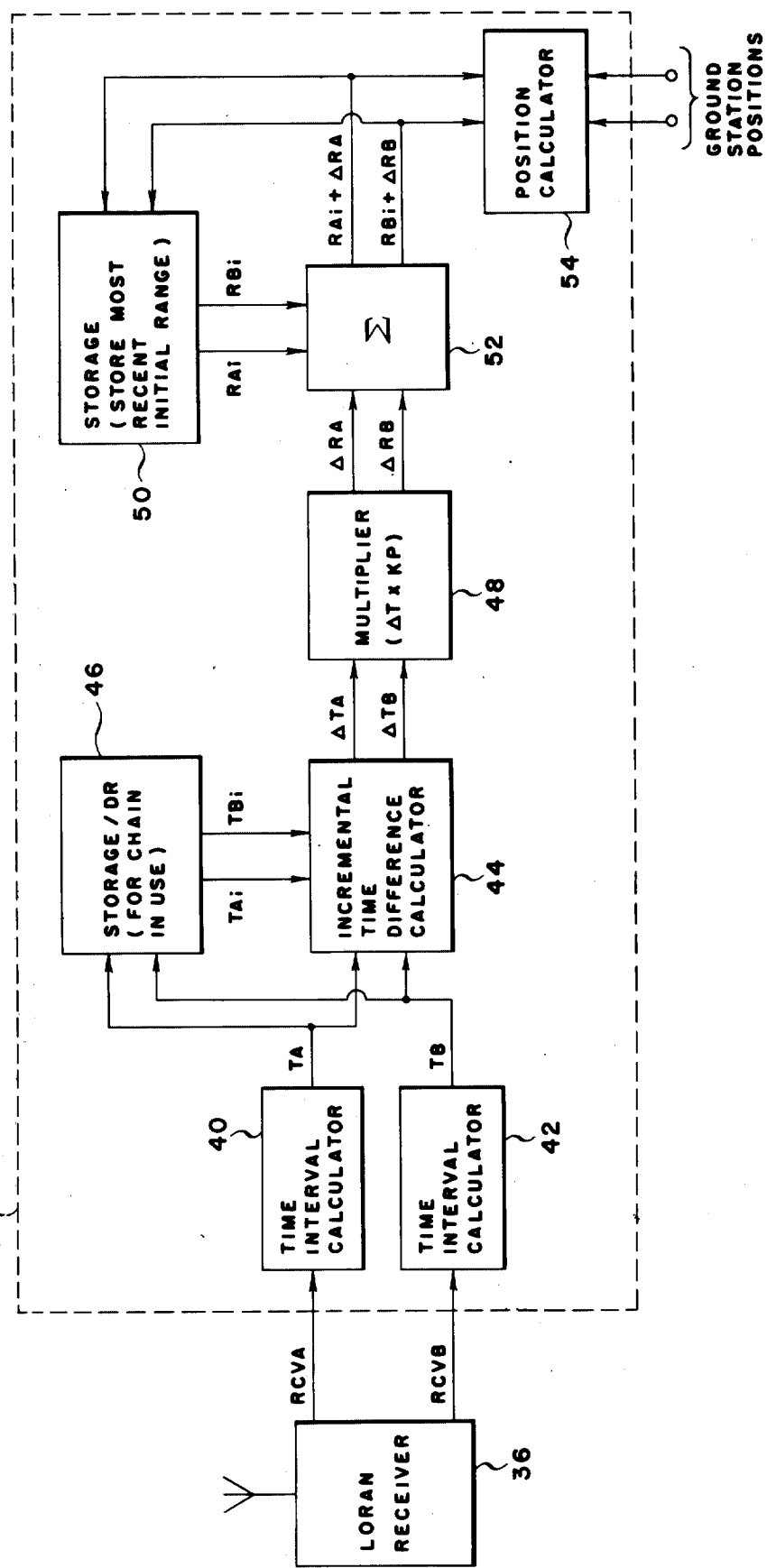

METHOD AND SYSTEM FOR NAVIGATION EMPLOYING INCREMENTAL RANGE DIFFERENCE

BACKGROUND OF THE INVENTION

The present invention relates to navigation and, more particularly, to a method for vehicular navigation utilizing signals transmitted from two or more known positions.

Navigation systems for vehicles such as ships and airplanes have evolved through various stages of development, commencing of course, with simple celestial systems. One of the first all-weather electronic navigation systems was the LORAN (long range navigation) system. The LORAN system operates on the assumption that two pulses of wave energy synchronously transmitted from widely separated transmitters will arrive simultaneously at any location equidistant from the transmitters. Thus a line of equidistance between the transmitters defines positions at which the signals from the transmitters will be received simultaneously. At all other positions relative to the transmitters, one signal will arrive sooner than the other and curved lines representing positions of equal time difference can be drawn. The result of plotting this information is a family of hyperbolic curves that represent lines of position. If a second pair of transmitters is located so that its lines of position cross those of the first pair of transmitters, a complete position locating system exists.

Essentially, a typical LORAN system operates in this manner and is therefore typically referred to as a hyperbolic system. It should be noted however, that in practice the LORAN system typically employs three transmitters arranged in a triangular configuration with one station being common to both pairs. Moreover, the signals are typically not transmitted simultaneously but at precisely spaced intervals.

One drawback of LORAN systems is decreased accuracy at long ranges. At relatively close ranges where the hyperbolic lines cross at close to right angles, any inaccuracies caused by system errors are minimized since possible position error due to jitter of the crossing lines is circular and position is known to be within that relatively small circle. However, when the lines approach parallelism at the longer ranges, any position error produces a long narrow ellipse and since actual position may be anywhere within this ellipse, position error is considerably greater as range increases.

One improvement in the LORAN system has been to use direct ranging techniques so that the lines of position are circular rather than hyperbolic. Direct ranging techniques involve the computation of range from two or more known positions to the vehicle so that at least two intersecting circles of position may be used to locate the position of the vehicle.

One such direct ranging system operates in conjunction with a conventional LORAN receiver to provide ranges to two or more LORAN stations so that positions may be determined. With this system, the navigation computer assumes a transmission time for the LORAN signals and then makes calculations based upon the actual arrival times of the signal to see if the assumption was correct. If the assumption was correct, the three ranges from the LORAN stations will form circles which cross at one point. If the circles do not cross at one point, the system makes a correction based upon the first answer and assumes another transmission time. By this method, the computer can converge on the exact range from each station and can thus determine the position of the vehicle.

While the direct ranging approach to navigation is more accurate than the hyperbolic approach of conventional LORAN systems, difficulties are still encountered because of propagation characteristics of the transmitted wave energy over different types of terrain and because of system timing inaccuracies and the like.

The present invention relates broadly to "radio navigation" as distinguished from the other conventional categories of navigation, i.e., pilotage, celestial navigation, and dead-reckoning. More particularly, the present invention relates to those radio navigation techniques/equipment/instrumentalities which provide position information based on the utilization of the finite, nearly constant, rate of electromagnetic wave propagation, i.e., on appropriate time or phase measurements. Examples of conventional radio-navigation systems include the "hyperbolic" type employing signal time-of-arrival-differences such as Loran, and hyperbolic types employing signal phase-of-arrival-differences such as Omega, and Decca. The present invention relates to "Direct Ranging" modes of some existing equipment, e.g., Loran, and also comprises a direct ranging (related) mode for signal phase-of-arrival-difference-measuring equipment such as conventional systems as Omega and Decca.

Contemporary systems-engineering practice calls for the use of any one, or any combination, of the four types of navigation systems (pilotage, celestial, dead-reckoning, radio) in a given vehicular system. In a given application, the systems-engineering practice entails judicious selection from all available types and techniques in order to achieve the desired level of accuracy, reliability, range, "security," automatic operation, ease-of-use, economy, size, weight, environment, servicability, etc. The present invention is compatible with the aforesaid "systems" approach to navigation, in that it embodies advances in radio-navigation apparatus.

It is accordingly an object of the present invention to provide a novel method of radio navigation having advantages over related radio-navigation methods.

It is a further object of the present invention to provide a novel method of radio navigation which is compatible with existing radio navigation system hardware.

It is another object of the present invention to provide a novel radio navigation method in which signal perturbations have less effect on position accuracy than in known systems.

It is yet another object of the present invention to provide a vehicular navigation method utilizing time difference information with respect to successive transmissions from each of two or more transmitter sites to provide radial increment of distance information for dead (deduced) reckoning type of position calculations.

These and other objects and advantages are accomplished in accordance with the present invention as will become apparent to one skilled in the art to which the invention pertains from a perusal of the following detailed description when read in conjunction with the appended drawings.

BRIEF DESCRIPTION OF THE DRAWINGS

FIG. 8 is a functional block diagram of a system operable in accordance with the method of the present invention; and, FIG. 9 is a graph illustrating determined ranges of the system of FIG. 6 as a function of time.

DETAILED DESCRIPTION

Figure 1:
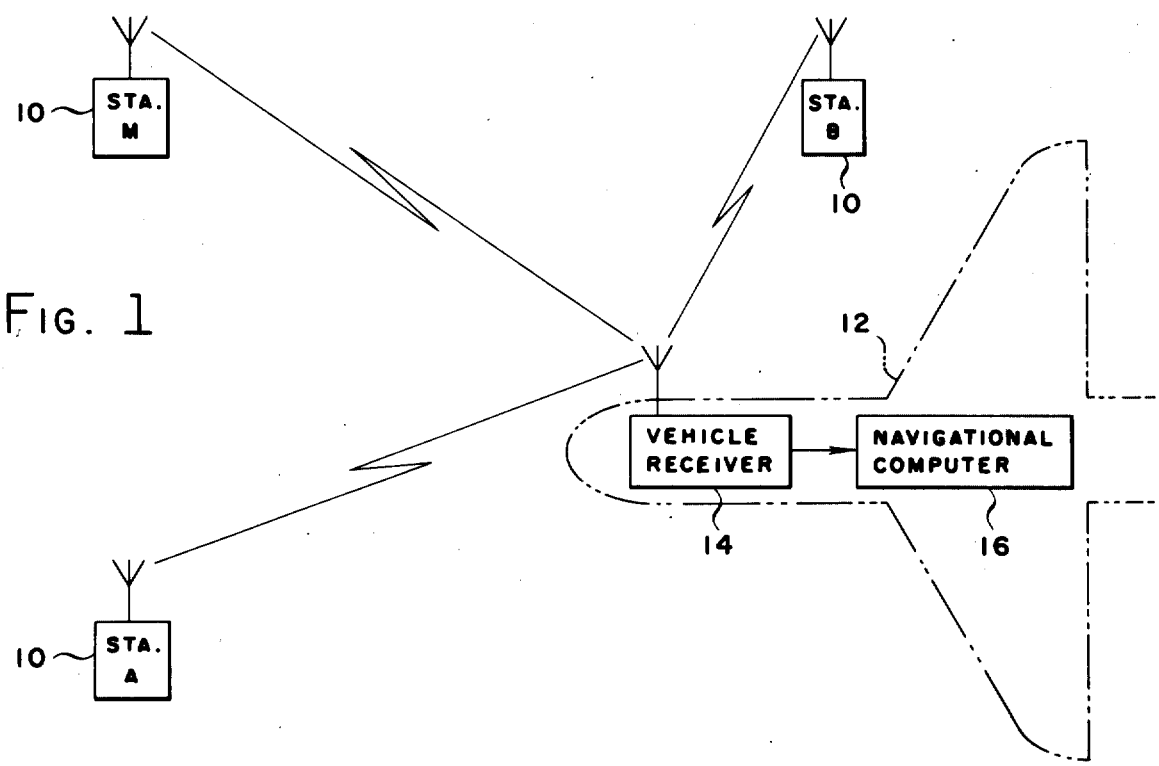
FIG. 1 is a schematic representation of a typical vehicular navigation system employed for aircraft navigation.

FIG. 1 schematically illustrates a typical vehicular navigation system for aircraft navigation, by way of example. Referring now to FIG. 1, several ground stations generally indicated at 10 and identified as stations A, B and M are typically located in a generally triangular configuration. In a typical LORAN system, the ground station M is a master station and the two stations A and B are slave stations. The three stations 10 transmit wave energy in a predetermined time sequence under the control of the master station M as will hereinafter be described in greater detail.

A vehicle such as an aircraft generally indicated at 12 is provided with a receiver 14 to receive the transmitted signals from the ground stations 10. The receiver 14 detects the wave energy transmitted from the ground stations 10 and supplies data to a navigational computer 16 which in turn determines the position of the vehicle.

In a typical LORAN system, three or more ground stations form a LORAN chain and the vehicle receiver 14 is tuned to a particular chain so as to receive and detect energy transmitted by only that chain. Typically, the master station M first transmits a pulse-coded signal and the slave stations A and B transmit subsequent thereto with a predetermined accurate delay. Each of the transmitted signals is coded so that the stations can be identified from the received signal. Thus, for example, a coded group of pulses from master station M may be first received by the receiver 14 and may commence a first timing cycle. Receipt of the coded pulse groups from the slave stations A and B may then be timed in relation to the receipt of the pulse group from the master station to provide the time difference information.

Figure 2:
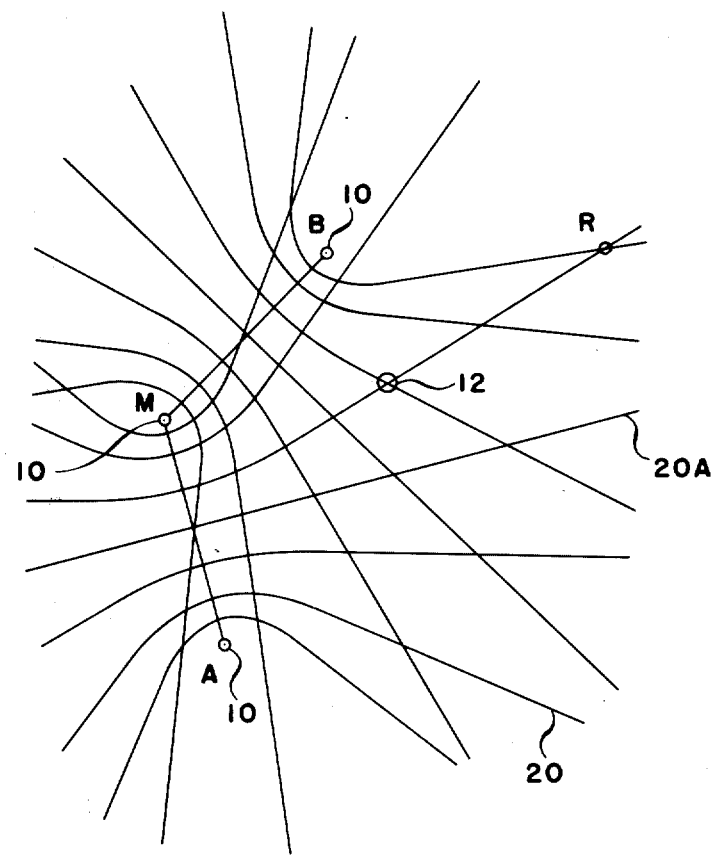
FIG. 2 is a graphical representation schematically illustrating the principles of operation of a typical hyperbolic LORAN system.

Hyperbolic and direct ranging systems differ primarily in the manner in which the time difference information is processed by the navigational computer 16. In a typical LORAN-C hyperbolic system schematically illustrated in FIG. 2, the time differences between receipt of signals from the master and slave stations is utilized to determine which hyperbolic lines of position 20 the receiver and thus the vehicle 12 lies along. Thus, for example, assuming that the master station transmits 100 milliseconds prior to slave station A and the time difference between receipt of the signals from the master and slave station A is 100 milliseconds, the receiver and thus the vehicle must lie along the line 20a in FIG. 2. This, of course, assumes that the propagation paths between the master station M and the receiver and between the slave station A and the receiver are identical. This also assumes that all other timing factors are correct, e.g., the clocks at both the master station and the vehicle are operating at the same relative rates.

Figure 3:
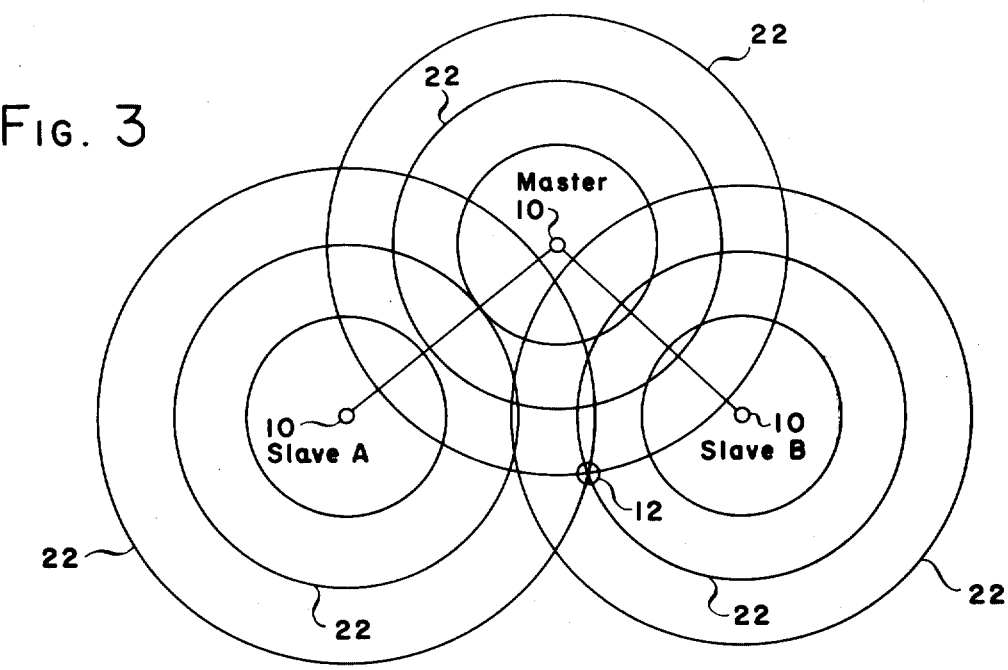
FIG. 3 is a graphical representation schematically illustrating the principles of operation of a direct ranging LORAN system.

In the direct ranging systems schematically illustrated in FIG. 3, the same signals may be received by the receiver in the vehicle 12 but the signals are processed differently. Specifically, the direct ranging approach to navigation involves the calculation of the ranges from the vehicle 12 to at least two of the ground stations 10 rather than the calculation of just time differences as in the hyperbolic approach. As a result, the lines of position are circular and radiate outwardly from each of the stations as is indicated by the lines 22 in FIG. 3.

In one direct ranging system which employs LORAN-C transmitting and receiving equipment, the navigational computer 16 (FIG. 1) is programmed to initially calculate the range from the vehicle 12 to at least three of the ground stations 10. The navigational computer first assumes a time of arrival of the signals from the three or more stations and then makes calculations based upon the actual arrival time of the signals. If the assumption is correct, the assumed times of arrival provide assumed ranges to the three or more stations which converge at one point. If convergence of the ranges does not occur, new assumptions are made and this process is continued until the ranges all converge at one point. When the computer has converged on the correct assumed ranges, this range information allows computer calibration of the LORAN receiver clock so that it is synchronized with the master LORAN transmitter clock. Thereafter, it is a relatively simple matter to determine ranges to the LORAN transmitters since it is known when the LORAN stations transmit and the time interval between transmission and reception can be accurately measured. From the determined ranges, aircraft position may be determined in a conventional manner in any appropriate coordinate system.

Of course, the LORAN receiver clock may not remain in perfect synchronization with the LORAN master station clock and periodic adjustment may be required. Moreover, other factors such as changes in the propagation characteristics of the paths between the ground stations and the vehicle introduce errors as will be described more fully hereinafter.

Figure 4:
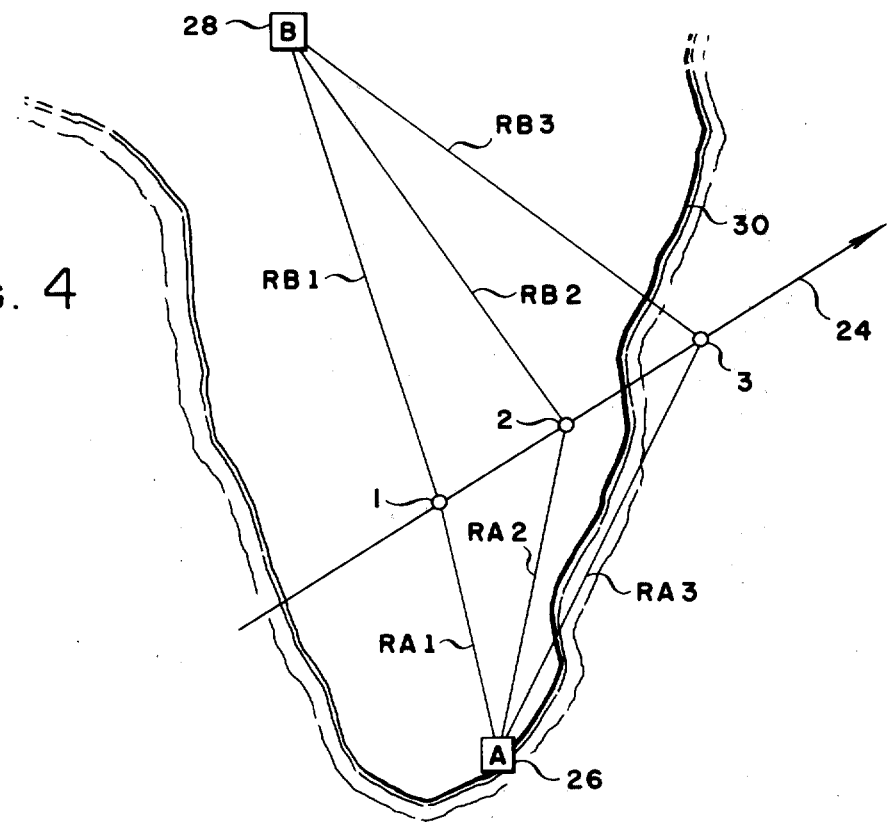
FIG. 4 is a schematic diagram further illustrating the operation of a direct ranging navigation system.
Figure 5:
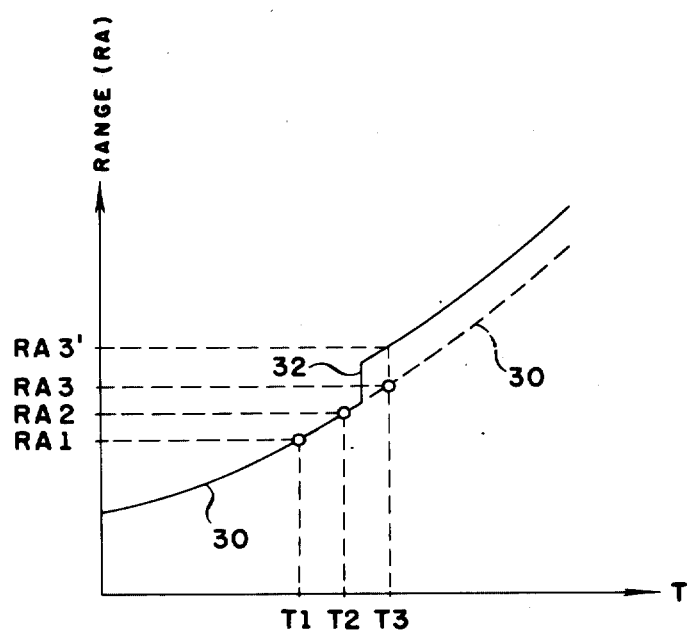
FIG. 5 is a graph illustrating determined ranges of the system of FIG. 4 as a function of time.

FIGS. 4 and 5 further illustrate the operation of a direct ranging navigation system and one of the problems encountered therewith. While this problem is discussed in the context of a direct ranging system, it should be understood that the same problem is encountered in known hyperbolic systems since they operate on a basis affected by changes in signal propagation times.

Referring now to FIG. 4, an aircraft or other vehicle may be proceeding along a path generally indicated at 24 and, for the purposes of illustration, may be proceeding at a constant speed and with a fixed heading. Two ground stations generally indicated at 26 and 28 may be located near a coastline 30 and may be transmitting in such a way that the vehicle is capable of obtaining range information from the transmissions. Thus, the stations 26 and 28 may be two stations in a LORAN chain and the range information may be obtained as in the previously described direct ranging system. Alternatively, the two stations 26 and 28 may be transponders of the type which are triggered in response to a signal transmitted from the vehicle. In this type of conventional ranging system, the overall time between transmission from the vehicle and receipt of a return signal from the ground station provides a basis for calculating the range between the vehicle and the ground stations. From the range information, the position of the vehicle can be conventionally determined in the desired coordinate system.

With continued reference to FIG. 4 and with reference now to FIG. 5, the two ranges RA1 and RB1 between the respective stations A and B and the vehicle may be determined at a first time T1 and at equal time intervals thereafter. The determined range RA1 between station A and the vehicle may be plotted graphically as a function of time (FIG. 5). The ranges RA2 and RA3 subsequently determined at times T2 and T3 may also be plotted on the graph of FIG. 5 to illustrate a commonly encountered problem in direct ranging and hyperbolic navigation systems.

At positions 1 and 2 of the vehicle, the propagation paths between the vehicle and the ground stations are entirely over land and are fairly similar. There is, accordingly, a consistency between the ranges measured at points 1 and 2 because of the consistency in propagation path characteristics. Thus, the determined ranges RA1 and RA2 generally lie along a continuous curve 30 as expected given the previous constant speed and heading assumptions.

However, at point 3 when the ranges are calculated, the propagation path between the vehicle and the ground station A is almost entirely over water. This sudden change in propagation path characteristics changes calculated range in a discontinuous manner. In the plot of range of FIG. 5, the discontinuity in range resulting from the sudden change in propagation path characteristics is manifested as a sudden increase (or decrease) in the determined range as generally indicated at 32.

Accordingly, when range is determined from the vehicle to station A at position 3, the determined range should lie along the curve 30 as indicated in FIG. 5 by the range value RA3. However, the determined range includes a discontinuity error introduced by the change in propagation path characteristics and the range value RA3' thus results from the range determination. Since this range error is introduced as a result of a change in signal transmission time, this same type of error shows up in a LORAN hyperbolic system operating on the basis of time difference calculations.

In a direct ranging system, it may be possible to limit this type of discontinuity error when it initially occurs, for example, by limiting range changes between successive range determinations to some maximum value related to an expected range at the new position, allowing for certain tolerance. However, since the same conditions exist after the initial change in range, the system eventually reaches a steady state operating condition which reflects the entire range discontinuity error illustrated in FIG. 5. Moreover, it is extremely important that a highly stable, accurate clock be provided and the cost of such clocks contributes heavily to the cost of the system.

In accordance with the present invention, the type of continuing range error caused by changing propagation path conditions or other continuing anomolies in the system timing, e.g., disparities in clock frequencies, can be minimized. Moreover, other advantageous results are provided as will become apparent to one skilled in the art to which the invention pertains from the following discussion of the navigation method of the invention.

More specifically, it will be seen that the navigation method according to the present invention possesses the advantages of known direct ranging navigation methods since position determinations are arrived at through the use of determined range values. However, the range values are determined in a manner much simpler than in known direct ranging methods and yet with extreme accuracy. Moreover, some of the error producing problems associated with known systems, both direct ranging and hyperbolic, are eliminated or at least minimized by the present navigation method.

Figure 6:
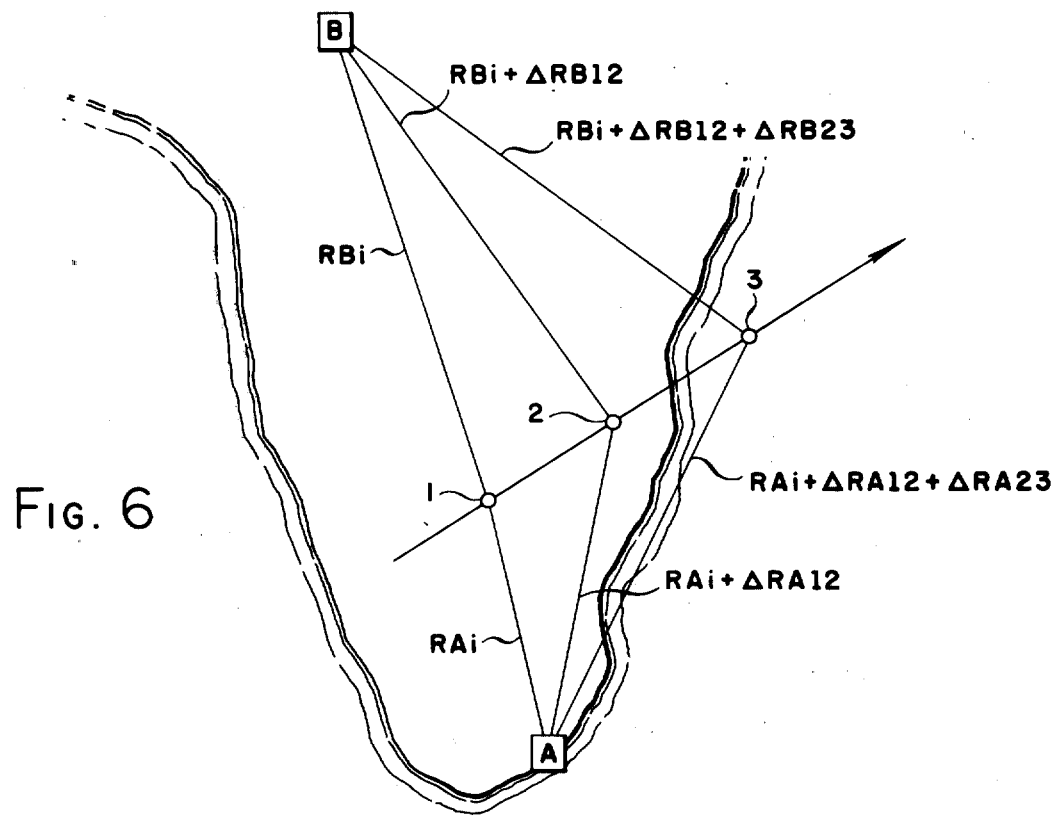
FIG. 6 is a schematic diagram illustrating a navigation system operating in accordance with the method of the present invention.

Referring to FIG. 6, two ground stations A and B including conventional wave energy transmitting equipment, e.g., two LORAN or other conventional navigation ground stations, are located at known geographical coordinates. Initial ranges $RA_i$ and $RB_i$ are determined between the vehicle at an initial position 1 and the two ground stations A and B at the known positions. The initial ranges $RA_i$ and $RB_i$ may be determined in any suitable conventional manner such as through conventional LORAN hyperbolic or direct ranging techniques or through the use of landmarks or other available position determining data or techniques. The two initially determined ranges $RA_i$ and $RB_i$ are, of course, present ranges from the vehicle to the two ground stations A and B. However, it will also be seen that these two initial ranges form the basis for succeeding computations at subsequent unknown positions of the vehicle.

At this same initially determined position of the vehicle, i.e., position 1, the time intervals between the receipt of two successive transmissions from each of the ground stations A and B is determined. Thus, for example, in FIG. 7 it can be seen that the transmitter at station A transmits successive, precisely timed bursts of wave energy as indicated by the wave form TXA. Between each transmission, the time interval TR exists. If the vehicle were stationary at position 1 for a long enough period of time to receive two sequential transmissions, the time interval between receipt of the two sequential transmissions (e.g., the interval TA1) would, of course, be exactly the same as the time interval TR with a slight time displacement TP due to the distance between the transmitter and receiver.

Subtracting TR from TA1 yields (in this instance) an incremental time difference $\Delta T$ equal to zero. This confirms what was positioned; no change in range to A between receipt of the first and second signals therefrom. If the vehicle then moves from its initial position to a new unknown location prior to receiving the next successive transmission, then the time interval between the latest successive transmissions will differ from the TR time interval. It can be seen that the amount of the difference is directly related to the difference in range between the vehicle and the transmitter. Therefore, the time interval TR between successive transmissions establishes a standard time decrement for application to each measured time interval between successively received signals at the vehicle.

In this regard, as the aircraft moves from point 1 to point 2 a third transmission is received at point 2 and the time interval between the second and third received transmissions is measured. This time interval TA2 would be the same as time interval TA1 and time interval TR if the vehicle had not moved between the times of receipt of transmissions 2 and 3, i.e., had not moved from position 1 to position 2. However, because the distance between the ground station A and the vehicle changes between receipt of transmissions 2 and 3 from the ground station A, the time interval between receipt of the second and third successive transmitted pulses will display an incremental time difference with respect to TR. Accordingly, by subtracting TR from the second time interval TA2, an incremental time difference $\Delta T$ directly related to the difference in range of the vehicle from the ground station at points 1 and 2 is determined.

The incremental time difference may be multiplied by an appropriate propagation constant, i.e., the propagation constant of electromagnetic wave energy through air under the prevailing atmospheric conditions, to obtain the actual change in range $\Delta RA12$ of the vehicle from the ground station A due to the movement of the vehicle from point 1 to 2. This change in range can then be algebraically summed with the initial range $RAi$ to obtain a new range of the vehicle from the station A. The new range $RAi$ plus $\Delta RA12$ then becomes the new initial range from the next range calculation.

Thus, for example, time interval TA3 is decremented by TR to yield the next $\Delta T$. Multiplying this new $\Delta T$ by the propagation constant yields the new range increment $\Delta RA$ 23 with respect to station A. $RAi$ plus $\Delta RA12$ plus $\Delta RA13$ becomes the new initial range of the vehicle from A at the corresponding new position 3.

The same procedure discussed above can be accomplished for the other ground station B so as to provide two initial or present ranges at each of the positions of the vehicle. From the range information, the actual geographical position of the vehicle at each of the locations 1-3 may be determined in a conventional manner as was previously discussed.

FIG. 8 illustrates the present invention functionally and may further facilitate an understanding of the invention. Referring now to FIG. 8, the method according to the present invention may be performed with conventional LORAN equipment including a LORAN receiver 36 and a conventional navigational computer 38 or other suitable conventional calculating device. The LORAN receiver may supply the signals RCVA and RCVB received from two ground stations A and B to respective time interval calculators 40 and 42 in the navigational computer 38. The time interval calculators 40 and 42 may conventionally calculate the time intervals between successive received pulses in the received LORAN signals and may supply the calculated time intervals TA and TB associated with the respective ground stations A and B to an incremental time difference calculator 44.

The fixed time interval TR associated with a given chain of transmitters may be stored in a suitable storage device 46. Thus, for example, as the current determined time intervals TA and TB are supplied to the incremental time difference calculator 44, the TR value (appropriate to the chain of transmitting stations being used) is supplied from the storage device 46 to the incremental time difference calculator 44.

The incremental time difference calculator 44 subtracts TR from the respective current time intervals TA and TB to provide the incremental time differences $\Delta TA$ and $\Delta TB$, respectively. A multiplier 48 multiplies the incremental time differences by a propagation constant KP to provide incremental range differences $\Delta RA$ and $\Delta RB$ related to the respective incremental time differences $\Delta TA$ and $\Delta TB$. The incremental range differences $\Delta RA$ and $\Delta RB$ are algebraically summed with the respective initial ranges $RAi$ and $RBi$ stored in a storage device 50 either from the previous cycle or from the initial range determinations made in a suitable conventional manner as was previously discussed. In this regard, a conventional summer 52 may calculate and provide the algebraic sums $RAi$ plus $\Delta RA$ and $RBi$ plus $\Delta RB$ both to the storage device 50 for use as the initial ranges in the next cycle of range calculations and to a position calculator 54 for determination of vehicle position in any suitable conventional manner as in other range determining navigation systems, e.g., direct ranging systems. In this connection, the position calculator 54 may be supplied with the known positions of the ground stations currently being used for range determinations.

The functions performed by the navigational computer 38 of FIG. 8 are simple arithmetic calculations readily programmable on existing navigational computers in, for example, LORAN systems or may be readily implemented by one skilled in the art with available analog or digital hardware. For example, the functions of the time interval calculators may be performed by any conventional circuitry or programming technique employed to determine a time interval between two spaced pulse signals.

The incremental difference calculator 44 merely functions to subtract TR from TA and TB and the multiplier 48 and summer 52 perform other conventional arithmetic calculations. The position calculator 54 may be any known circuitry or program for determining vehicle position from range and ground station position data.

Figure 7:
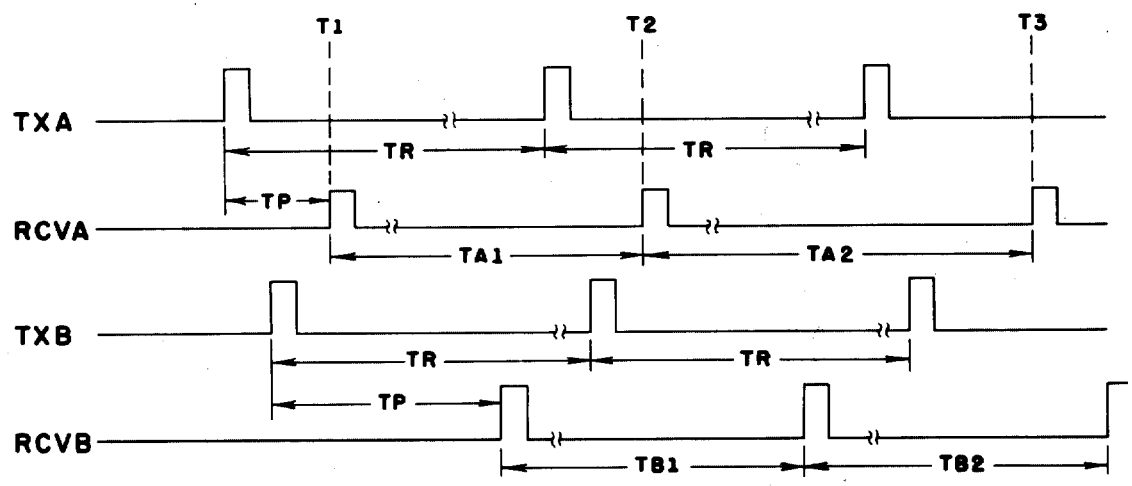
FIG. 7 is a timing diagram showing exemplary timing between transmitted and received signals of the system of FIG. 6.
Figure 9:
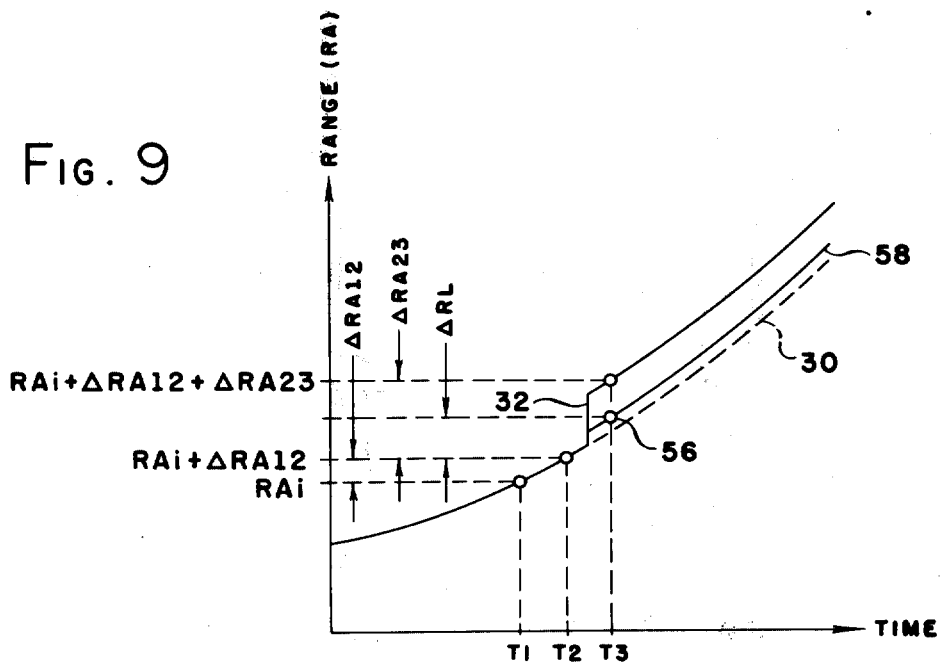

FIG. 9 is a graph of range versus time for the situation shown in FIG. 7 and provides an illustrative example of one important advantage of the navigation method of the present invention over known methods. With reference now to FIG. 9, it will be appreciated that the range discontinuity 32 exists between the measurements of ranges at points 2 and 3 (i.e., at times T2 and T3) as long as wave energy propagation time is a factor in the measurements. However, it will also be appreciated from the following discussion that the problem of discontinuity errors of the type previously discussed, e.g., those errors which arise when the transmission path transitions from land to water or vice versa, can be minimized when employing the navigation technique according to the present invention.

As discussed in connection with FIG. 5, there exists a curve 30 along which determined ranges from the ground station A should lie under the assumptions previously discussed. Because, as in other systems, the method according to the present invention employs time intervals affected by propagation path characteristics in determining ranges, the range discontinuity 32 will contribute to the incremental time difference determination between points T2 and T3. Accordingly, the range increment $\Delta RA23$ (which is directly related to the determined incremental time difference as was previously described) will exhibit the discontinuity error. However, the range increment can be limited to a maximum value (dependent, for example, on vehicle speed and heading) prior to summing the determined range interval with the previously determined initial range.

Thus, for example, a range difference $\Delta RL$ may be imposed on range changes with respect to the ground station A. Accordingly, despite the fact that the determined range change is the value $\Delta RA23$ illustrated in FIG. 9, the allowed maximum range change may be limited to the value $\Delta RL$ of FIG. 9 so as to provide a new initial or present range at time T3 equal to RA$i$ plus $\Delta RA12$ plus $\Delta RL$ as is generally indicated at 56. The next time interval between received transmissions will include the increased (or decreased) propagation time caused by the discontinuity error 32. However, since each of any two successive transmissions from A is slowed down (or speeded up) equally after the vehicle crosses the "discontinuity boundary" the associated $\Delta T$ values are not affected thereby, i.e., the incremental time difference utilized to determine the next incremental range difference will not be affected by the discontinuity error. The plot of range versus time employing the navigation method according to the present invention will thus generally follow a curve 58 which includes some limited range error. It can therefore be seen that the effect of discontinuity errors on the range determinations can be minimized when employing the navigation method according to the present invention.

It will also be appreciated that actual propagation times between ground stations and the vehicle, e.g., the times TP in FIG. 7, need not be determined as in the direct ranging navigation method. Moreover, the initial or present ranges can be initialized at any convenient time through, for example, relatively high quality position data available from known check points or the like so as to provide even greater accuracy.

It will also be appreciated that, like direct ranging navigation techniques, the present invention provides high quality position data at relatively long ranges from ground stations because, as was previously explained, the geometric dilution of precision is, typically, much less for direct ranging than for hyperbolic modes. Moreover, only two stations are required for a complete solution and the computer software does not have to simulate/track absolute transmission time, or times, of the various stations.

In addition to the above, the method according to the present invention does not require a heading reference and is therefore not subject to degradation of accuracy from this source as in classical dead reckoning techniques. Moreover, any long-term anomolous bias in the phase of the standard sampling point is cancelled out. Any phase variation is slow with respect to the data sampling rate (when employing LORAN hardware) and each successive iteration is referenced to the initial bias. The incremental position determinations are not effected by this bias.

It will moreover be appreciated that ground wave velocity anomolies resulting from ground plane impedance variations have a much smaller effect on position determinations made in accordance with the present invention than those made by direct ranging techniques. This results because direct ranging techniques are dependent upon the absolute time interval between transmission and reception while the present invention relies on an incremental difference. For direct ranging, therefore, the cumulative lead/lag effect along the entire path length appears as an error in computed arc length. In accordance with the present invention, the differencing technique eliminates all except the effect of the anomoly associated with the net change in arc distance relative to the point of initiation.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A method of navigation comprising the steps of:
   a. determining an initial position relative to a plurality of known points each located at predetermined geographic positions and each having a source of radio frequency electromagnetic wave energy;
   b. determining the distance of the initial position from each of the plurality of known points;
   c. moving to a second and unknown position;
   d. determining the difference between the propagation time of electromagnetic wave energy from each of the plurality of points at the initial and second positions to thereby determine an incremental change in the distance to the second position from each of the plurality of points;
   e. algebraically summing the distance of the initial position and the incremental change in distance from each of the plurality of points to thereby determine the distance of the second position from each of the plurality of known points; and,
   f. determining the second position from the determined distances of the second position from each of the plurality of known points.
2. The method of claim 1 wherein the time interval between two initial transmissions of electromagnetic wave energy is known and wherein the difference in propagation time of electromagnetic wave energy from each of the plurality of known points is determined by:
   detecting the time of arrival of electromagnetic wave energy from two transmissions subsequent to at least one of the initial transmissions;
   determining the elapsed time between the detected times of arrivals of the electromagnetic wave energy;
   subtracting the known time interval between initial transmissions of the electromagnetic wave energy from the elapsed time to thereby determine the difference in propagation time of the electromagnetic wave energy without knowing the absolute time of transmission.
3. The method of claim 2 including the steps of:
   determining the algebraic sum of the distance of the initial position from each of the plurality of known points, and the distance of the second position from each of the plurality of known points, to obtain a calculated incremental range; and,
   limiting the calculated incremental range to each known position to predetermined maximum values between transmissions.
4. The method of claim 1 including the steps of:
   determining the algebraic sum of the distance of the initial position from each of the plurality of known points, and the distance of the second position from each of the plurality of known points, to obtain a calculated incremental range; and, limiting the calculated incremental range to each known position to predetermined maximum values between transmissions.

5. A method of vehicle navigation comprising the steps of:

a. determining initial range distances from an initial vehicle position to each of a plurality of known geographic positions spaced from the vehicle;

b. periodically transmitting pulses of wave energy from each of the known geographic positions;

c. receiving the periodically transmitted pulses of wave energy at the vehicle;

d. determining an initial time interval between the receipt of a first transmitted pulse received at an initial known position of the vehicle and a second successive transmitted pulse from each of said known geographic positions the period between said pulses from each of said known geographic positions comprising a respective standard-time-decrement;

e. subtracting the absolute value of said standard-time-decrement from said initial time interval to obtain an adjusted time interval;

f. determining a subsequent time interval between receipt of said second successive transmitted pulse and a third successive transmitted pulse received at a second position of the vehicle, from each of the known positions, said subsequent time interval being adjusted by subtracting the absolute value of said standard-time-decrement from the time between said second successive transmitted pulse and said third successive transmitted pulse, from each of said known geographic positions;

g. calculating an incremental range distance from each of said adjusted time intervals associated with the known positions;

h. algebraically summing the initial range distance to each of the known positions and respective incremental range distances to obtain updated range distances to each of the known positions; and, i. computing an updated vehicle position in response to the updated range distances.

6. The method of claim 5 including the steps of:

a. storing the updated initial distance and the determined subsequent time intervals; and, b. repeating steps (e) through (i) for each subequently measured time interval.

7. The method of claim 6 including the step of limiting the calculated incremental range distance to each known position to predetermined maximum values related to expected maximum range distance changes between transmissions.

8. The method of claim 5 including the step of limiting the calculated incremental range distance to each known position to predetermined maximum values related to expected maximum range distance changes between transmissions.

9. In a vehicular navigation system including at least two spaced transmitting stations at known geographic positions and each having a means for periodically transmitting pulses of wave energy from each of the known geographic positions, the period between said pulses from each of said known geographic positions comprising a respective standard-time-decrement, the system including a receiver carried by the vehicle for receiving and detecting the periodically transmitted pulses of wave energy at the vehicle, the improvement comprising:

means for storing initial range distances from an initial vehicle position to each of the spaced transmitting stations at the known geographic positions;

means for storing the respective standard-time-decrement associated with the period between pulses from each of said known geographic positions;

means for determining an initial time interval between receipt of first and second successive transmitted pulses received at the initial position of the vehicle from each of the known positions;

means for subtracting the absolute value of said standard-time-decrement from said initial time interval to obtain an adjusted time interval;

means for determining a subsequent time interval between receipt of said second transmitted pulse and a third successive transmitted pulse received at a second position of the vehicle from each of the known positions;

means for subtracting the absolute value of said standard-time-decrement from said subsequent time interval to obtain a second adjusted time interval;

means for calculating an incremental range distance from each of said adjusted time intervals associated with the known positions;

means for algebraically summing the initial range distance to each of the known positions and the respective incremental range to obtain updated initial range distances to each of the known positions; and, means for determining an updated vehicle position in response to the updated initial range distances.

* * * * *